United States Patent [15] 3,689,512
Shah et al. [45] Sept. 5, 1972

[54] NOVEL 3-ETHERIFIED-1,3,5(10)-TRIENE-STEROIDS AND PROCESS THEREOF

[72] Inventors: Harshavadan C. Shah, Collingdale; George C. Buzby, Jr., Philadelphia; Herchel Smith, Bryn Mawr, all of Pa.

[73] Assignee: American Home Products Corporation, New York, N.Y.

[22] Filed: Oct. 6, 1970

[21] Appl. No.: 78,583

[52] U.S. Cl.....260/397.4, 260/239.55 C, 260/397.5, 424/242
[51] Int. Cl............................................C07c 169/20
[58] Field of Search........................260/397.4, 397.5

[56] References Cited

FOREIGN PATENTS OR APPLICATIONS

| 1,010,052 | 11/1965 | Great Britain..........260/397.5 |
|---|---|---|
| 1,029,325 | 5/1966 | Great Britain..........260/397.5 |
| 1,055,353 | 1/1967 | Great Britain..........260/397.5 |
| 980,594 | 1/1965 | Great Britain..........260/397.4 |

*Primary Examiner*—Elbert L. Roberts
*Attorney*—Andrew Kafko, Joseph Martin Weigman, Dwight J. Potter, Vito Victor Bellino, Robert Wiser and David E. Frankhouser

[57] ABSTRACT

Disclosed are new and novel 3-cyclobutyloxy, 3-cyclopropylmethoxy and 3-cyclobutylmethoxy-1,3,5(10)-trien-steroids and a method for the production thereof by reacting the corresponding 3-hydroxy steroids with a (lower)alkoxide in a (lower)alkanol followed by an appropriate tosylate or halade of cyclopropylmethyl, cyclobutyl and cyclobutylmethyl. The new and novel compounds are useful for depressing lipid levels in animals.

18 Claims, No Drawings

NOVEL 3-ETHERIFIED-1,3,5(10)-TRIENE-STEROIDS AND PROCESS THEREOF

This invention is concerned with new and novel steroid compounds useful in therapy and as intermediates for the production of therapeutically useful compounds and with a new and novel process for the production of the aforementioned steroids. The new and novel compounds of this invention have highly increased antilipemic activity, when compared to a standard compound.

More particularly, this invention is concerned with compounds having the formula:

(I)

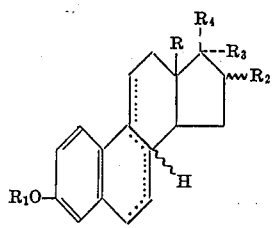

wherein R is (lower)alkyl; $R_1$ is selected from the group consisting of cyclobutyl, cyclobutylmethylene and cyclopropylmethylene; $R_2$ is selected from the group consisting of hydroxy and hydrogen; $R_3$ is selected from the group consisting of hydrogen, (lower)alkyl, (lower)alkenyl, (lower)alkynyl and halo(lower)-alkynyl and $R_4$ is hydroxy; $R_3$ and $R_4$ together are oxo or are concatenated to form ethylenedioxy; the dotted lines represent optional unsaturation; and the symbol ( $\{$ ) indicates $\alpha$- or $\beta$- configuration. Of particular interest are the compounds of Formula (I) identified as follows:

d-3-(cyclobutyloxy)estra-1,3,5(10)-trien-17-one;
d-3-(cyclobutyloxy)-19-nor-17α-pregna-1,3,5(10)-trien-20-yn-17-ol, methanolate;
d-3-(cyclobutylmethyloxy)estra-1,3,5(10)-trien-17-one;
d-3-(cyclobutylmethloxy)-19-nor-17α-pregna-1,3,5(10)-trien-20-yn-17-ol;
dl-13-ethyl-3-(cyclobutylmethoxy)gona-1,3,5(10)-trien-17-one;
dl-13-ethyl-3-(cyclobutylmethoxy)-18,19-dinor-17α-pregna-1,3,5(10)-trien-20-yn-17-ol;
d-3-(cyclopropylmethoxy)estra-1,3,5(10)-trien-17-one;
d-3-(cyclopropylmethoxy)-19-nor-17α-pregna-1,3,5(10)-trien-20-yn-17-ol;
dl-13-ethyl-3-(cyclobutylmethoxy)gona-1,3,5(10)-trien-17β-ol;
d-3-(cyclobutylmethoxy)estra-1,3,5(10)-trien-17β-ol.

Also, this invention is concerned with a process for the preparation of a 3-substituted-13-(lower)alkyl-gona-(and 8-isogona)-1,3,5(10)-trien-17-one of the formula:

(II)

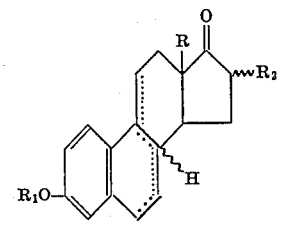

and the $\Delta^6$-, $\Delta^7$-, $\Delta^{8(9)}$-, $\Delta^{9(11)}$- and the $\Delta^{6,8(9)}$- dehydro analogs thereof, wherein R is (lower)alkyl; $R_1$ is selected from the group consisting of cyclobutyl, cyclobutylmethylene and cyclopropylmethylene; $R_2$ is selected from the group consisting of hydroxy and hydrogen; the dotted lines represent optional unsaturation; and the symbol ( $\{$ ) indicates $\alpha$- or $\beta$- configuration which comprises forming a 3-ether derivative of a corresponding 3-hydroxyl steroid compound of the formula:

(III)

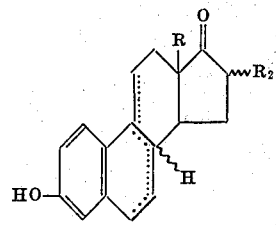

wherein R and $R_2$ are as hereinabove defined by the steps of:

a. reacting said 3-hydroxyl steroid with at least about one equivalent of an alkali metal or alkaline earth metal (lower)-alkoxide in a (lower)alkanol medium until conversion of the 3-hydroxyl group to the corresponding anionic form is substantially complete;

b. displacing said (lower)alkanol medium with an inert organic solvent medium;

c. reacting the mixture of Step (b) with at least about one equivalent of a compound of the formula X–Y, wherein X is selected from the group consisting of cyclobutyl, cyclobutylmethyl and cyclopropylmethyl and Y is a halide or tosylate group; and d. recovering the product of Step (c).

Special mention is made of a number of important embodiments of the above-described process invention. These are, respectively:

A process as next defined above wherein, in Step (a), said alkali metal (lower)alkoxide is sodium methoxide and said (lower)alkanol medium is methanol.

A process as first defined above, wherein, in Step (b), said inert organic solvent medium is dimethylsulfoxide.

A process as first defined above wherein Step (c) is carried out at a temperature of from about 20° to about 100° C. for a period of from about 2 hours to about 48 hours.

A process as first defined above, wherein, in Step (c), said halide is bromide.

A process as first defined above wherein d-3-(cyclobutyloxy)estra)-1,3,5(10)-trien-17-one is prepared by the steps of:

a. reacting d-estrone with sodium methoxide in methanol;

b. removing the methanol by vacuum distillation and adding dimethylsulfoxide;

c. reacting the mixture of Step (b) with cyclobutylbromide; and d. recovering the product by removing the solvent by distillation in a vacuum.

A process as first defined above wherein d-3-(cyclobutylmethyleneoxy)estra-1,3,5(10)-trien-17-one is prepared by the steps of:

a. reacting d-estrone with sodium methoxide in methanol;

b. removing the methanol by vacuum distillation and adding dimethylsulfoxide;
c. reacting the mixture of Step (b) with cyclobutylmethyl tosylate; and
d. recovering the product by extracting the mixture of Step (c) with ether and water and distillation in a vacuum.

A process as first defined above wherein dl-13-ethyl-3-(cyclobutylmethyloxy)gona-1,3,5(10)-trien-17-one is prepared by the steps of:
a. reacting dl-13-ethyl-3-(hydroxy)-gona-1,3,5(10)17-one with sodium methoxide in methanol;
b. removing the methanol by vacuum distillation and adding dimethyl-sulfoxide;
c. reacting the mixture of Step (b) with cyclobutylmethyl tosylate; and
d. recovering the product by adding water to the mixture of Step (c), extracting with ether and distilling the extract in a vacuum.

A process as first defined above wherein d-3-(cyclopropylmethoxy)estra-1,3,5(10)-trien-17-one is prepared by the steps of:
a. reacting d-estrone with sodium methoxide in methanol;
b. removing the methanol by vacuum distillation and adding dimethylsulfoxide;
c. reacting and mixture of Step (b) with cyclopropylmethyl tosylate; and
d. recovering the product by adding water to the mixture of Step (c), extracting with ether and distilling the extract in a vacuum.

When used herein and in the appended claims, the term "(lower)alkoxy" or "(lower)alkoxide" contemplates hydrocarbonoxy radicals, straight and branched chain, containing from about one to about six carbon atoms, and includes methoxy, ethoxy, n-propoxy, i-propoxy, n-butoxy, t-butoxy, n-pentoxy, n-hexoxy, 2-methyl-pentoxy, and the like, The term "(lower)alkyl" contemplates hydrocarbon radicals, straight and branched chain, containing from about one to about six carbon atoms, and includes methyl, ethyl, n-propyl, i-propyl, n-butyl, t-butyl, n-pentyl, n-hexyl, 2-methylpentyl, and the like. The term "(lower)alkenyl" contemplates mono- and di-olefinic hydrocarbon radicals, straight and branched chain, containing from about two to about six carbon atoms, and includes vinyl, alkyl, 2-methyl-2-butenyl, isopropenyl, 1,3-butadienyl, 2-pentenyl, 3-hexenyl and the like. The term "(lower)alkynyl" contemplates mono- and diacetylenic hydrocarbon radicals, straight and branched chain, containing from about two to about six carbon atoms, and includes ethynyl, propargyl, 2-butynyl, 1,3,-butadynyl, 2-pentynyl 3-hexynyl and the like. The term "halo" when used by itself or in association with (lower)alkyl, (lower)alkenyl or aryl contemplates halogens, and includes fluorine, chlorine, bromine and iodine. The phase "inert organic solvent" contemplates solvents which are organic and are not susceptible to reaction with the steroids, halides and tosylates contemplated herein under the conditions exemplified and includes, for example, chloroform, tetrahydrofuran (THF), benzene, dioxane, dimethylformamide (DMF), dimethylsulfoxide (DMSO), 1,2-dimethoxyethane and the like. All temperatures used herein and in the appended claims are in degrees Celsius unless otherwise indicated.

Starting materials of Formula (III) are commercially available or can readily be prepared by techniques familiar to those skilled in the art. For example, d-estrone, a compound of Formula (III), wherein R is methyl, C–8(H) is $\beta$ and $R_2$ is hydrogen, is an item of commerce. The 3-hydroxy13-(lower)alkylgona-1,3,5(10)-triene-17-ones of Formula (III) are prepared by means exemplified in U.S. Pat. No. 3,488,258 and U.S. Pat. No. 3,502,698. The 3-hydroxy-13-(lower)alkyl-8-isogona-1,3,5(10-triene-17-ones of Formula (III) are prepared by means exemplified in U.S. Pat. No. 3,407,217. The 3-hydroxy-13-(lower)alkyl-1,3,5(10),7-tetraene-17-ones of Formula (III) are prepared by means exemplified by R. P. Stein, G. C. Buzby, Jr. and H. Smith in copending U. S. Pat. application, Ser. No. 760,212, filed Sept. 16, 1968, now U.S. Pat. No. 3,555,015. The 3-hydroxy-13-(lower)alkylgona-1,3,5(10),8(9)-tetraene-17-ones of Formula (III) are prepared by means exemplified in U.S. Pat. No. 3,391,169. The 3-hydroxy-13-(lower)alkylgona-1,3,5(10),9(11)-tetraene-17-ones of Formula (III) are prepared by means exemplified in U.S. Pat. No. 3,391,170. The 3-hydroxy-13-(lower)alkylgona-1,3,5(10)-triene-17-ones (and the 16-hydroxy analogs thereof) of Formula (III) are prepared by means exemplified by G. A. Hughes and H. Smith in copending U.S. Pat. application Ser. No. 534,353, filed Mar. 15, 1966 now U.S. Pat. No. 3,519,714 . The 3-hydroxy-13-(lower)alkylgona-1,3,5(10),6,8,(9)-pentaene-17-ones of Formula (III) are prepared by means exemplified in U.S. Pat. No. 3,475,468.

The 3-hydroxy-13-(lower)alkylgona-1,3,5(10),6-tetraene-17-ones are prepared from the 3-methoxy-13-(lower)alkylgona-1,3,5(10)-trienes of U.S. Pat. Ser. No. 534,353, filed Mar. 15, 1966 by introducing a 6-keto group with t-butyl chromate in carbon tetrachloride; reduction to the 6-ol with a hydride, such as sodium borohydride; and dehydrating, as with $POCl_3$ in dimethylformamide, or p-toluenesulfonic acid (or iodine) in refluxing benzene to introduce the double bond between $C_6$ and $C_7$, according to procedures such as those described in G. C. Buzby, Jr.; G. H. Douglas, C R. Walk and H. Smith, Excerpta Medica Int. Cong. Series No. 132 Proceedings of the Second Int. Congress on Hormonal Steroids, Milan, May 1966, p. 311; then cleaving the 3-methoxy group in a known way, e.g., by refluxing with pyridine hydrochloride or by cleavage with a Grignard reagent according to U.S. Pat. No. 3,436,411. Introduction of the 16$\alpha$- or $\beta$-hydroxy group is also accomplished in known ways. For example, the substrates are oximated in the presence of an alkyl nitrite and the 16-oximino compound is hydrolyzed, for instance, by reduction with zinc and a lower alkanoic acid to give a 16-ketone. This is reduced to the 16$\alpha$-ol, for instance, with an alkali metal and lower alkanol or by catalytic hydrogenation to give the 16$\beta$-ol. These methods are exemplified in U.K. Pat. No. 115,954.

The cyclopropylmethyl, cyclobutyl and cyclobutylmethyl halides and tosylates are items of commerce or may be prepared by means well known to those skilled in the art. For example, cyclobutylbromide is available commercially from Ash Stevens, Inc., Detroit, Michigan 48202 or may be prepared by the method described in Cason et al., J. Org. Chem., 14, 31–36, 1949. Cyclobutylmethyl tosylate is prepared from cyclobutanecarboxylic acid, available commercially from Ash Stevens, Inc., by reducing to cyclobutanmethanol using the procedure described in Kuivila et al, JACS, 74, 4953–54, 1952, and Organic Reactions, Volume VI, John Wiley, followed by conversion to the tosylate using the method of Braker et al, JACS, 69, 866–69, 1947. Similarly, cyclopropylmethanol, available commercially from Aldrich Chemical Company Inc., is converted to cyclopropylmethyl tosylate using the method of Braker et al., supra.

In carrying out Step (a) of the instant process, the steroid of Formula (III) may be added to the mixture of the alkali metal (lower)alkoxide and the (lower)alkanol at any convenient temperature, e.g. from about 10° to about 50° C., or even higher. It is preferred to use at least about one equivalent amount of the alkali metal (lower)alkoxide, or a slight excess, e.g. up to about a 10 percent excess, based on the steroid starting material. The reaction forming the anion salt, especially at about 25° C., is quite rapid and is substantially complete almost instantaneously.

In carrying out step (b), displacement of the (lower)-alkanol by the inert organic solvent, resort can be made to adding the solvent and fractionally distilling off the (lower)-alkanol. However, especially in cases where the respective boiling points are close, it is preferred and convenient first to distill off the (lower)alkanol, then to resuspend the residue in the desired volume of inert organic solvent.

In carrying out Step (c), reaction of the product of Step (b) with the ether forming agent can be added to the mixture at temperatures of from about 10° to about 150° C., but preferably at from about 20° to about a 100° C. It is preferred to use at least about one equivalent amount of the ether forming agent, or a slight excess, e.g., up to about a 10 percent excess, based on the steroid. The reaction forming the desired ether product is substantially complete, depending on the temperature, in from about 2 to 48 hours.

After reaction is complete, recovery of the product of Formula II according to Step (d) is accomplished by conventional methods. For example, sometimes the product can be induced to precipitate by cooling the mixture, especially if it first has been concentrated, then the precipitate is recovered by filtration. One especially useful means is to distill off all of the reaction solvent, leaving the product as a residue. To proceed in this manner, the solvent is distilled off in a vacuum. The mixture then can be extracted with a water immiscible organic solvent, such as ether and dried. Evaporation of the solvent leaves the product of Formula II as a residue. If desired, it may be further purified by chromatography: it is dissolved in benzene and passed through a column of active silica gel, Florex. The eluates can be combined and evaporated. The residue can often be induced to crystallize by trituration with ether or isopropanol and can be recrystallized from a (lower)alkanol.

The time and temperature ranges used in describing the aforementioned process steps simply represent the most convenient ranges consistent with carrying out the reaction in a minimum of time without undue difficulty. Thus, reaction temperatures appreciably below these can be used, but their use considerably extends the reaction time. Similarly, reaction temperatures appreciably below these can be used, but their use considerably extends the reaction time. Similarly, reaction temperatures higher than those mentioned can be employed with a concomitant decrease in reaction time, although purity of the product may be somewhat decreased.

The sources for the starting materials of Formula III have been specified hereinabove. Generally, all can be prepared by totally synthetic processes described by Douglas, Graves, Hartley, Hughes, McLoughlin, Siddall and Smith in J. Chem. Soc., 1963, pages 5077–94. In the product of a total synthesis which has not included a suitable resolution stage the compounds prepared by the invention will be present as racemates. Using a convention approved by Fieser and Fieser, "-Steroids," p. 336 (1959), the compounds designated as the d-forms are the enantiomers corresponding in configuration at C–13 to that of the natural hormone estrone. The corresponding enantiomorphs are consequently designated the l-forms and the racemates the d-forms. Racemates will be depicted by structural formulas which show only the enantiomorphs of the d-configuration.

The 3-ether steroids of Formula (II) are further reacted to provide other pharmacologically active compounds of Formula (I). For example: the 17-keto group of the compounds of Formula (II) can be ethynylated, such as with acetylene and lithium acetylide or lithium chloroacetylide, to provide the corresponding 17α-ethynyl or chlorethynyl-17β-ol steroids; the 17-keto group of the compounds of Formula (II) can be reduced to a 17β-hydroxy group by treatment with a reducing agent, such as sodium borohydride; the 17-keto group of the compounds of Formula (II) can be converted to the corresponding 17α-alkyl, 17α-alkenyl or 17α-alkenyl-17β-ol by treatment with the appropriate magnesium bromide derivative, such as methyl magnesium bromide; the 17-keto group can be converted to a 17,17-ethylenedioxy group by treatment of ethylene glycol catalyzed with p-toluenesulfonic acid.

The compounds of this invention possess extremely enhanced anti-lipemic activity in animals when tested as follows:

Male weanling rats are fed a hypercholesterolemic diet for three weeks. Serum cholesterol is determined on 0.01 ml. of serum separated from tail blood collected in a capillary tube. Groups of rats with equal average serum cholesterol are given the test compound orally once a day by syringe for three days. Serum cholesterol is determined in the morning of the fourth day. Anti-lipemic activity is demonstrated by a lowering of the serum cholesterol. Potency is expressed as the percent activity of a concomitantly run standard compound, dl-13-ethyl-3-methoxy-8α-gona-1,3,5(10)-trien-17β-ol.

Certain compounds of Formula (I) require special notice when tested in the above-described procedure. These compounds followed by the present activity when compared to the test standard compound are:

d-3-(cyclobutyloxy)estra-1,3,5(10)-triene-17-one (600 percent);

d-3-(cyclobutyloxy)-19-nor-17α-pregna-1,3,5(10)-triene-20-yn-17-ol, methanolate (greater than 100 percent);

d-3-(cyclobutylmethyloxy)-19-nor-17α-pregna-1,3,5(10)-trien-20-yn-17-ol (1,800 percent); and d-3-(cyclobutylmethoxy)estra-1,3,5(10)-trien-17β-ol (175 percent).

The compounds of Formula (I) demonstrated non-feminizing active lipid depression in animals when tested as follows:

Adult male rats receive test compound daily for nine days. At autopsy on the tenth day body and testis weights are taken and a blood sample is submitted to biochemistry for cholesterol analysis. Compounds producing depression in blood lipid at doses that are not feminizing are of particular interest. The standard is estrone.

Compounds of Formula (I) of particular interest and usefulness resulting from the above-described test procedure include:

d-3-(cyclobutyloxy)estra-1,3,5(10)-trien-17-one;

d-3-(cyclobutylmethoxy)estra-1,3,5(10)-trien-17-one;

d-3-(cyclopropylmethoxy)-19-nor-17α-pregna-1,3,5(10)-trien-20-yn-17-ol; and dl-13-ethyl-3-(cyclobutylmethoxy)gona-1,3,5(10)-trien-17β-ol.

As is mentioned hereinabove, the compounds prepared by this process have high anti-lipemic activity. This makes them useful to treat conditions in mammals responsive to treatment to lower blood lipid level of mammals and can be used whenever anti-lipemic agents are indicated, such as in the treatment of various hyperlipidaemias or where the incidence of atherosclerosis is to be minimized. The products prepared by the instant process are also useful as intermediates for the preparation of other steroids, which have hormonal or other useful activities. The compounds of the present invention, Formula (I), are effective anti-lipemic agents when administered to animals in a dosage range of from about 0.05 mg. up to about 200 mg. of active compound administered daily. Particularly interesting activity is demonstrated in the range of 0.1 mg. up to about 10.0 mg. administered daily. The administration may be at one time or in spaced, divided portions.

The products of Formula I prepared by this invention can be used in association with a pharmaceutically acceptable carrier. They can be formulated in liquid or solid forms, for instance as capsules, tablets, suppositories, powders, dispersible granules, cachets, and the like by combining them with conventional carriers. Such conventional carriers include magnesium carbonate, or stearate, talc, sugar, lactose, pectin, dextrin, starch, gelatin, tragacanth, methyl cellulose, sodium carboxymethyl cellulose, low melting wax or cocoa butter. Diluents, flavoring agents, solubilizers, lubricants, suspending agents, binders or tablet-disintegrating agents can be used. Powders or tablets preferably contain 5 or 10 to 99 percent of the active constituent. The active steroid can be formulated with an encapsulating material with or without other carriers.

Liquid preparations such as solutions, suspensions or emulsions can also be used. Such preparations include dispersions in a pharmaceutically acceptable carrier such as arachis oil or sterile water, preferably containing a nonionic surface active agent such as fatty acid esters of polyhydroxy compounds, e.g., sorbitan, aqueous starch in sodium carboxymethylcellulose solutions, aqueous propylene glycol or polyethylene glycol. Thus, a water-propylene glycol solution can be used for parenteral injection and aqueous suspensions suitable for oral use can be made by utilizing natural or synthetic gums, resins, methyl cellulose or other well-known suspending agents.

The composition can be in unit dose form in which the dose unit is for instance from about 0.1 to about 200 mg. of each active steroid. The unit dose form can be a packaged composition, e.g., packeted powder, vials or ampules or, for example, in the form of capsules, cachets or tablets or any number of these in packaged form. The pharmaceutical compositions can also consist substantially solely of the active steroid when this is in unit dose form. When used for the purposes stated above, the dosage of the compounds will vary with the condition being treated, but a good starting dosage in general will be in the range established for estradiol (Merck Index, Seventh Edition, p. 416 [1960]).

Merely by way of illustration, in a standard anti-lipemic assay in male weanling rats of about 100 g. means body weight fed on a hypercholesterolemic diet for three weeks, d-3-(cyclo-butylmethyloxy)-19-nor-17 α-pregna-1,3,5(10)-trien-20-yn-17-ol demonstrated significant extreme lowering of the serum cholesterol level following administration of 0.1 mg. perorally daily for three days.

Of course, as will be clear to those skilled in the art, in addition to substrates designated by the formula above, the process broadly can be applied to obvious chemical equivalents thereof but differing therefrom in the sense of having other functional groups attached to the steroid nucleus, whenever such groups do not themselves interfere or become affected by the process, unless, in exceptional instances, this is a desired effect. Similarly, the steroid nucleus may contain any substitution at positions other than at 16 or 17, as, for example, 6-methyl. Broadly stated, therefore, useful substrates would be represented by the formula

Z—OH wherein Z is a cyclopentanopolyhydrophenanthrene nucleus, with an aromatic A-ring monosubstituted by —OH which, on the formation of an ether derivative of the form Z—OR₁, wherein R₁ is as set forth in Formula (I), would provide a product with high anti-lipemic activity.

DESCRIPTION OF THE PREFERRED EMBODIMENTS

The following examples are given by way of illustration and are not to be construed as limitations of this invention, variations of which are possible without departing from the scope and spirit thereof.

EXAMPLE I d-3-(Cyclobutyloxy)estra-1,3,5(10)-trien17-one

Add with stirring to a solution of sodium methoxide (0.6 g.) in methanol (100 ml.), d-estrone (3.0 g.). Stir additional one-half hour. Remove the methanol in vacuo. Transfer the dry salt to a 3-necked flask and dissolve it in dimethyl-sulfoxide (DMSO) (75 ml.). Add three ml. of cyclobutylbromide and heat the mixture with stirring at 60°–70° C. (water bath) for 3 hours. Add 3 ml. of cyclobutylbromide and heat with stirring for four more hours. Let stand at room temperature overnight.

Add water (300 ml.) with stirring. Extract the mixture with ether. Remove the solvent from the dry extract *in vacuo*. Dissolve the residue in benzene (50 ml.) and filter off the insoluble (starting material). Filter the benzene solution through a column of Florex. Remove the solvent from the filtrate *in vacuo*. Recrystallize the residue, a white clear oil, from methanol to give 1.39 g. of a product, m.p. 130°–136° C.

Prepare an analytical sample by one more recrystallization (1.39 g.) from methanol to give the title product (1.01 g.), m.p. 135°–137° C. $\lambda_{max}^{KBr}$ 5.72, 8.19 $\mu$. $[\alpha]_D^{24} = +134°$ (c=1, CHCl$_3$).

ANALYSIS Calcd. for $C_{22}H_{28}O_2$: C, 81.44; H, 8.70.
Found: C, 81.08; H, 8.47.

EXAMPLE II d-3-(cyclobutyl methyloxy)estra-1,3,5(10)-trien-17-one

Add with stirring, to a solution of sodium methoxide (0.6 g.) in methanol (100 ml.), d-estrone (3.0 g.). Stir an additional one-half hour. Remove methanol *in vacuo*. Dissolve the dry salt in DMSO (75 ml.), add cyclobutylmethyl tosylate (2.0 g.) and stir the mixture at room temperature for 6 hours and let stand at room temperature overnight. Add water (300 ml.) with stirring. Extract the mixture with ether, remove the solvent from the dry extract *in vacuo* and dissolve the residue in benzene (50 ml.). Filter, pass the filtrate through a column of Florex. Remove the solvent *in vacuo*. Recrystallize the residue from methanol to give the title product (1.15 g.), m.p. 114°–118° C. 5.83 $\mu$ $[\alpha]_D^{24} = +132°$ (c+1, CHCl$_3$).

ANALYSIS Calcd. for $C_{23}H_{30}O_2$: C, 81.61; H, 8.93.
Found: C, 81.80; H, 8.95.

EXAMPLE III d-3-(Cyclopropylmethoxy)estra-1,3,5(10)-trien-17-one

Add, with stirring, to a solution of sodium methoxide (0.6 g.) in methanol (100 ml.), d-estrone (3.0 g.). Stir an additional one-half hour. Remove methanol *in vacuo*. Dissolve the dry salt in DMSO (75 ml.) and add, with stirring, cyclopropylmethyl tosylate (2.0 g.). Stir the mixture at room temperature for six hours and let stand at room temperature overnight. Add water (300 ml.) with stirring. Extract the mixture with ether. Remove the solvent *in vacuo* from the dry extract. Dissolve the residue in benzene. Filter. Pass the filtrate through a column of Florex. Remove the solvent from the filtrate *in vacuo*. Recrystallize the residue from methanol to get the title product (650 mg.), m.p. 125°–127° C. $\lambda_{max}^{KBr}$ 5.72 $\mu$ $[\alpha]_D^{24} = +142$ (c=1, CHCl$_3$).

EXAMPLE IV

The procedures set forth in Examples I, II and III are repeated, substituting for d-estrone, stoichiometrically equivalent amounts of the following steroidal phenols:

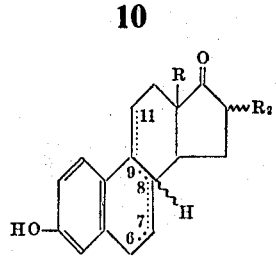

| R | C-8 | Δ | R$_2$ |
|---|-----|---|------|
| CH$_3$ | C-H(β) | — | H |
| CH$_3$CH$_2$CH$_2$ | C-H(β) | — | α-OH |
| (CH$_3$)$_2$CHCH$_2$ | C-H(β) | — | H |
| CH$_3$(CH$_2$)$_4$CH$_2$ | C-H(β) | — | β-OH |
| CH$_3$CH$_2$ | — | Δ$^7$ | H |
| CH$_3$ | C-H(β) | Δ$^{9(11)}$ | β-OH |
| CH$_3$ | — | Δ$^{8(9)}$ | H |
| CH$_3$CH$_2$ | — | Δ$^6$ | H |
| CH$_3$ | C-H(β) | Δ$^{6,8(9)}$ | H | and the following 3-etherified-steroids are respectively obtained:

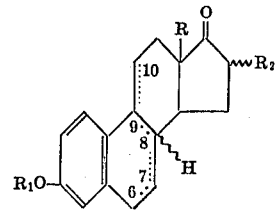

| R | C-8 | Δ | R$_2$ | R$_1$ |
|---|-----|---|------|-------|
| CH$_3$ | C-H(α) | — | H | ▷—CH$_2$— |
| CH$_3$CH$_2$CH$_2$ | C-H(β) | — | α-OH | ◇—CH$_2$— |
| (CH$_3$)$_2$CHCH$_2$ | C-H(β) | — | H | ◇—CH$_2$— |
| CH$_3$(CH$_2$)$_4$CH$_2$ | C-H(β) | — | β-OH | ◇—CH$_2$— |
| CH$_3$CH$_2$ | — | Δ$^7$ | H | ▷—CH$_2$— |
| CH$_3$ | C-H(β) | Δ$^{9(11)}$ | α-OH | ◇— |
| CH$_3$ | — | Δ$^{8(9)}$ | H | ◇— |
| CH$_3$CH$_2$ | — | Δ$^6$ | H | ▷—CH$_2$— |
| CH$_3$ | C-H(β) | Δ$^{6,8(9)}$ | H | ▷—CH$_2$— |

EXAMPLE V d-3-(Cyclobutyloxy)-19-nor-17α-pregna-1,3,5(10)-trien-20-yn-17-ol, methanolate Suspend d-3-(cyclobutyloxy)estra-1,3,5(10)-trien-17-one (1.18 g.) in dry dimethylsulfoxide (~30 ml.) in a 3-necked flask, equipped with a drying tube, magnetic stirrer and a gas inlet. Saturate the suspension with dry acetylene gas for one hour. Add lithium acetylide-ethylenediamine complex ( in two aliquots of 1.0 g.), one and one-half hour apart, continuing passing of acetylene and stirring, for a total of three hours after the first addition of lithium acetylide. Pour the brown mixture into ice water and let stand for one-half hour. Extract the mixture with ether, remove the solvent from the dry extract *in vacuo*. Dissolve the residue in benzene and filter through a column of Florex. Remove the solvent from the benzene solution *in vacuo*. Recrystallize the residue from methanol to give the title product (770 mg.), m.p. 120°–122° C (Solvate) $\lambda_{max}^{KBr}$ 3.12, 8.17 μ; $[\alpha]_D^{24} = +5°$ (c=1, CHCl$_3$).

ANALYSIS Calcd. for $C_{24}H_{30}O_2 \cdot CH_3OH$: C, 78.5; H, 8.98.
Found: C, 78.32; H, 8.84.

EXAMPLE VI d—3-(Cyclobutylmethyloxy)-19-nor-17α-pregna-1,3,5(10)-trien-20-yn-17-ol

Suspend d-3-(cyclobutylmethyloxy)estra-1,3,5(10)-trien-17-one (1.83 g.) in dry DMSO (about 50 ml.) in a dry 3-necked flask equipped with a drying tube, magnetic stirrer and a gas inlet. Saturate the suspension for one hour with dry acetylene gas. Add lithium acetylide-ethylenediamine complex (2.0 g.) and stir with passing acetylene gas for three hours. Pour the mixture into ice water and let stand for one-half hour. Extract the mixture with ether. Remove the solvent from the dry extract, dissolve the residue in benzene (about 50 ml.) and filter through a column of Florex. Remove the solvent from the filtrate *in vacuo*. Dissolve the residue in dichloromethane, add charcoal and heat on a steambath. Filter through a bed of Super Cel. Remove the solvent from the filtrate *in vacuo*. Recrystallize the residue from a small volume of hexane to get the product (725 mg.), m.p. 80°–85° C.; $\lambda_{max}^{KBr}$ 2.95, 3.1 μ. $[\alpha]_D^{24} = 4$ (c=1, CHCl$_3$).

ANALYSIS Calcd. for $C_{25}H_{32}O_2$: C, 82.37; H, 8.85.
Found: C, 81.61; H, 8.51 81.38 8.50.

EXAMPLE VII d-3-(Cyclopropylmethoxy)-19-nor-17α-pregna-1,3,5(10)-trien-20-yn-17-ol

Suspend d-3-(cyclopropylmethoxy)estra-1,3,5(10)-trien-17-one (560 mg.) in dry DMSO (30 ml.) in a 3-necked flask, equipped with a drying tube, a magnetic stirrer and a gas inlet. Saturate the suspension with dry acetylene gas for one hour. Add lithium acetylide-ethylenediamine complex in two aliquots (0.5 g.) one and one-half hour apart, continuing passing of acetylene gas and stirring for a period of three hours after the first addition. Pour the brown mixture into ice-water and let stand for one-half hour. Extract this mixture with ether. Remove the solvent from the dry extract *in vacuo*. Dissolve the residue in benzene and filter through a column of Florex. Remove the solvent from the filtrate *in vacuo*. Dissolve the oil in ether and filter through cotton. Remove the ether on a steambath. Pump the residue into a dry glass (400 mg.) $\lambda_{max}^{KBr}$ 2.95, 3.09 μ.

ANALYSIS Calcd. for $C_{24}H_{30}O_2$: C, 82.24; H, 8.63.
Found: C, 81.96; H, 8.80.

EXAMPLE VIII

The procedures set forth in Examples V, VI and VII are repeated, substituting for d-estrone, stoichiometrically equivalent amounts of the etherified 17-one steroids provided in Example IV and the following 17-α-ethynyl-17-β-ol steroids are obtained:

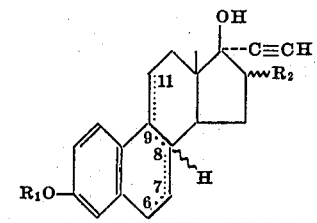

| R | C-8 | Δ | R$_2$ | R$_1$ |
|---|---|---|---|---|
| CH$_3$ | C-H(α) | — | H | ▷—CH$_2$— |
| CH$_3$CH$_2$CH$_2$ | C-H(β) | — | α-OH | ◇—CH$_2$— |
| (CH$_3$)$_2$CHCH$_2$ | C-H(β) | — | H | ◇—CH$_2$— |
| CH$_3$(CH$_2$)$_4$CH$_2$ | C-H(β) | — | β-OH | ◇—CH— |
| CH$_3$CH$_2$ | —Δ$^7$ | | H | ▷—CH$_2$— |
| CH$_3$ | C-H(β) | Δ$^{9(11)}$ | α-OH | ◇— |
| CH$_3$ | — | Δ$^{8(9)}$ | H | ◇— |
| CH$_3$CH$_2$ | — | Δ$^6$ | H | ▷—CH$_2$— |
| CH$_3$ | C-H(β) | Δ$^{6,8(9)}$ | H | ▷—CH$_2$— |

EXAMPLE IX d-3-(Cyclobutylmethoxy)estra-1,3,5(10)-trien-17β-ol

Dissolve d-3-(cyclobutylmethoxy)estra-1,3,5(10)-trien-17-one (1.0 g.) in methanol (75 ml.). Add sodium borohydride (1.0 g.) with stirring in small aliquots, over a period of 1 hour. Stir the mixture for three hours. Add water (75 ml.) slowly with stirring. Extract the mixture with ether. Remove the solvent *in vacuo* from the dry ether extract. Dissolve the residue in dichloromethane, add charcoal and heat on a steambath. Filter through a bed of Super Cel. Remove the solvent from the filtrate *in vacuo*. Recrystallize the residue from methanol to get (460 mg.) the title product, mp. 120°–123° C. $\lambda_{max}^{KBr}$ 2.93 μ. $[\alpha]_D^{24} = +67$ (c=1, CHCl$_3$).

ANALYSIS Calcd. for $C_{23}H_{32}O_2 \cdot \frac{1}{4}$ CH$_2$OH: C, 80.12; H, 9.54.

Found: C, 80.41; H, 9.88.

EXAMPLE X

The procedure of Example IX is repeated, substituting for d-3-(cyclobutylmethoxy)estra-1,3,5(10)-trien-17-one, stoichio-metrically equivalent amounts of the 3-etherified-17-one steroids provided in Examples I, III and IV and the following 3-etherified-17βol steroids are provided:

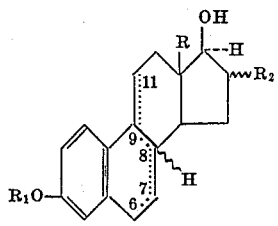

| R | C-8 | Δ | R$_2$ | R$_1$ |
|---|---|---|---|---|
| CH$_3$ | C-H(α) | — | H | cyclobutyl |
| CH$_3$ | C-H(α) | — | H | cyclopropyl-CH$_2$— |
| CH$_3$CH$_2$CH$_2$ | C-H(β) | — | α-OH | cyclobutyl-CH$_2$— |
| (CH$_3$)$_2$CHCH$_2$ | C-H(β) | — | H | cyclobutyl-CH$_2$— |
| CH$_3$(CH$_2$)$_4$CH$_2$ | C-H(β) | — | β-OH | cyclobutyl-CH$_2$— |
| CH$_3$CH$_2$ | — | Δ$^7$ | H | cyclopropyl-CH$_2$— |
| CH$_3$ | C-H(β) | Δ$^{9(11)}$ | α-OH | cyclobutyl |
| CH$_3$ | — | Δ$^{8(9)}$ | H | cyclobutyl |
| CH$_3$CH$_2$ | — | Δ$^6$ | H | cyclopropyl-CH$_2$— |
| CH$_3$ | C-H(β) | Δ$^{6,8(9)}$ | H | cyclopropyl-CH$_2$— |

EXAMPLE XI d-3-Cyclobutyloxy-17,17-(ethylenedioxy)estra-1,3,5(10)-triene

Reflux d-3-(cyclobutyloxy)estra-1,3,5(10)-trien-17-one (2.5 g.) in benzene (80 ml.) and ethylene glycol (22 ml.) with p-toluenesulfonic acid (0.3 g.) for sixteen hours. Cool the solution, pour into saturated sodium bicarbonate and extract with ether. Wash the organic layer with brine, dry and evaporate. Crystallize the residue from ethanol (40 ml.) to obtain the title product.

In a similar manner, using the appropriate starting materials of Examples II, III and IV, the following 17,17-ethylenedioxy-steroids are provided:

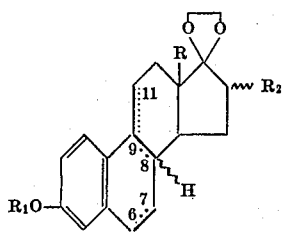

| R | C-8 | Δ | R$_2$ | R$_1$ |
|---|---|---|---|---|
| CH$_3$ | C-H(α) | — | H | cyclobutyl-CH$_2$— |
| CH$_3$ | C-H(α) | — | H | cyclopropyl-CH$_2$— |
| CH$_3$CH$_2$CH$_2$ | C-H(β) | — | α-OH | cyclobutyl-CH$_2$— |
| (CH$_3$)$_2$CHCH$_2$ | C-H(β) | — | H | cyclobutyl-CH$_2$— |
| CH$_3$(CH$_2$)$_4$CH$_2$ | C-H(β) | — | β-OH | cyclobutyl-CH$_2$— |

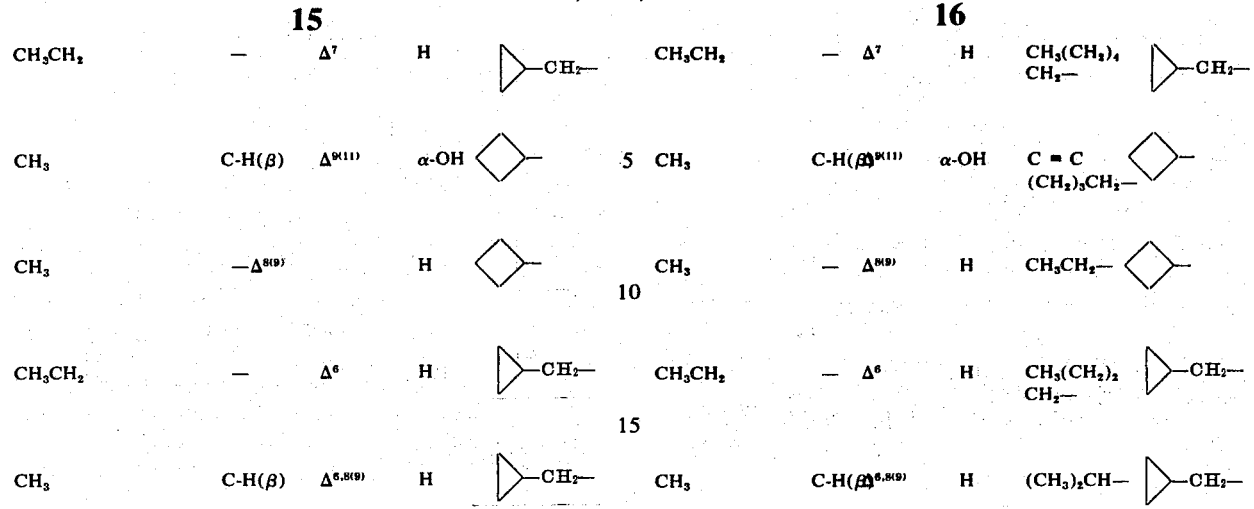

| | | | | | | | | |
|---|---|---|---|---|---|---|---|---|
| CH₃CH₂ | — | Δ⁷ | H | ▷-CH₂— | CH₃CH₂ | — | Δ⁷ | H | CH₃(CH₂)₄CH₂— | ▷-CH₂— |
| CH₃ | C-H(β) | Δ⁹⁽¹¹⁾ | α-OH | ◇— | CH₃ | C-H(β) | Δ⁹⁽¹¹⁾ | α-OH | C≡C(CH₂)₃CH₂— | ◇— |
| CH₃ | | —Δ⁸⁽⁹⁾ | | H | ◇— | CH₃ | | —Δ⁸⁽⁹⁾ | | H | CH₃CH₂— | ◇— |
| CH₃CH₂ | — | Δ⁶ | H | ▷-CH₂— | CH₃CH₂ | — | Δ⁶ | H | CH₃(CH₂)₂CH₂— | ▷-CH₂— |
| CH₃ | C-H(β) | Δ⁶,⁸⁽⁹⁾ | H | ▷-CH₂— | CH₃ | C-H(β) | Δ⁶,⁸⁽⁹⁾ | H | (CH₃)₂CH— | ▷-CH₂— |

EXAMPLE XII d-3-Cyclobutyloxy-17α-methylestra-1,3,5(10)-trien-17β-ol

Dissolve d-3-(cyclobutyloxy)estra-1,3,5(10)-trien-17-one (4 g.) in benzene (200 ml.). Add dropwise, with stirring every five minutes, an ethereal solution of methyl magnesium bromide (23.2 ml.; from the metal, 1.6 g.). Reflux the resulting solution for one hour, cool, pour onto ice, acidify with 5N hydrochloric acid, and extract with ether. Wash the organic layer with saturated aqueous sodium bicarbonate, then water. Dry, evaporate the solution, and recrystallize the residue from isopropanol to obtain the title compound.

In a similar manner, using the appropriate starting materials of Examples II, III and IV, the following compounds are provided:

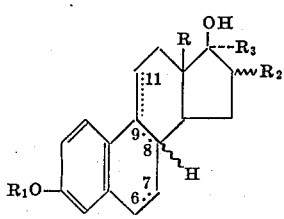

EXAMPLE XIII d-21-Chloro-3-(cyclobutyloxy)-19-nor-17α-pregna-1,3,5(10)-trien-20-yn-17ol Add d-3-(cyclobutyloxy)estra-1,3,5(10)-trien-17-one (2.8 g.) to a solution of lithium chloroacetylide (from 1.6 g. of lithium methyl and about 2.5 cc. of 1,2-dichloroethylene in 25 cc. of ether). Stir the mixture for 1 hour and then pour into water and extract with ether. Wash, dry and evaporate the solvent and recrystallize the residue from methanol to obtain the title compound.

In a similar manner, using the appropriate starting materials from Examples II, III and IV, the following compounds are provided:

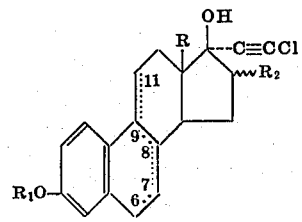

| R | C-8 | Δ | R₂ | R₃ | R₁ | R | C-8 | Δ | R₂ | R₁ |
|---|---|---|---|---|---|---|---|---|---|---|
| CH₃ | C-H(α) | — | H | CH₃CH₂— | ◇-CH₂— | CH₃ | C-H(α) | — | H | ◇-CH₂— |
| CH₃ | C-H(α) | — | H | C≡C—CH₂CH₂— | ▷-CH₂— | CH₃ | C-H(α) | — | H | ▷-CH₂— |
| CH₃CH₂CH₂ | C-H(β) | — | α-OH | H₂C=CH—CH₂— | ◇-CH₂— | CH₃CH₂CH₂ | C-H(β) | — | α-OH | ◇-CH₂— |
| (CH₃)₂CHCH₂ | C-H(β) | — | H | CH₃CH=CHCH₂— | ◇-CH₂— | (CH₃)₂CHCH₂ | C-H(β) | — | H | ◇-CH₂— |
| CH₃(CH₂)₄CH₂ | C-H(β) | — | β-OH | CH₂=CH— | ◇-CH₂— | CH₃(CH₂)₄CH₂ | C-H(β) | — | β-OH | ◇-CH₂— |

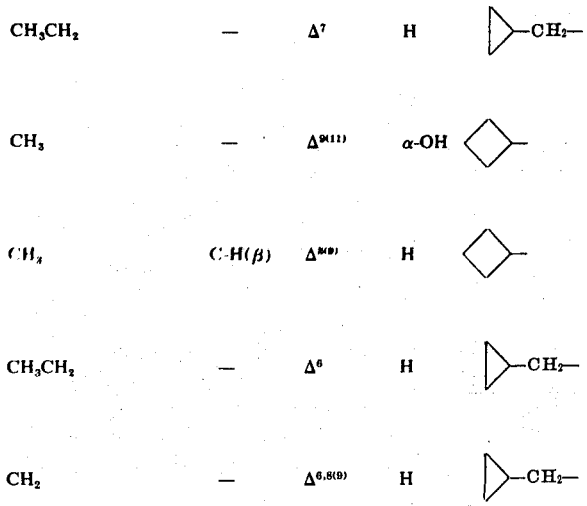

EXAMPLE XIV dl-13-Ethyl-3-(cyclobutylmethyloxy)gona- 1,3,5(10)-trien-17-one

Add, with stirring, to a solution of sodium methoxide (0.7 g.) in methanol (100 ml.), dl-13-ethyl-3-(hydroxy)gona-1,3,5(10)-trien-17-one. Stir the mixture for an additional one-half hour and remove the methanol in vacuo. Suspend the dry salt in DMSO (100 ml.). Add to the suspension a solution of cyclobutylmethyl tosylate (2.5 g.) in DMSO (25 ml.). Let stand at room temperature overnight, with stirring. Add water (300 ml.) with stirring and extract the mixture with ether. Remove the solvent from the dry extract in vacuo. Suspend the residue in benzene (50 ml.), triturate and filter. Pass the filtrate through a column of Florex. Remove the solvent from the filtrate in vacuo. Recrystallize the residue, a clear oil, from methanol to get the product (925 mg.), m.p. 100°–102° C.; $\lambda^{KBr}_{max.}$ 5.78 $\mu$.

ANALYSIS Calcd. for $C_{24}H_{32}O_2$: C, 81.77; H, 9.15.

Found: C, 81.30; H, 9.14.

EXAMPLE XV dl-13-Ethyl-3-(cyclobutylmethyloxy)-18,19-dinor-

17α-pregna-1,3,5(10)-trien-20-yn-17ol

Suspend dl-13-ethyl-3-(cyclobutylmethyloxy)gona-1,3,5(1010)-trien-17-one (1.0 g.) in dry DMSO (30 ml.) in a flask equipped with a magnetic stirrer, a drying tube and a gas inlet. Saturate the suspension with dry acetylene gas for one hour. Add lithium acetylide-ethylenediamine complex in two aliquots (2.0 g.), one and one-half hour apart, continuing passing acetylene gas and stirring for a total of three and one-half hours after the first aliquot has been added. Pour the brown black mixture into ice water and let stand for one-half hour. Extract the mixture with ether. Remove the solvent from the dry extract in vacuo. Suspend and triturate the residue in benzene. Filter. Pass the filtrate through a column of Florex. Remove the solvent from the filtrate in vacuo. Dissolve the residue in dichloromethane, add charcoal and heat on a steambath. Filter through a bed of Super Cel. Remove the solvent in vacuo. Dissolve the residue in ether and filter through cotton. Remove ether on steam bath and pump into a dry glass (125 mg.) $\lambda^{KBr}$ 2.95, 3.1 $\mu$.

EXAMPLE XVI dl-13-Ethyl-3-(cyclobutylmethoxy)gona- 1,3,5(10)-trien-17βol

Dissolve dl-13-ethyl-3-(cyclobutylmethoxy)gona-1,3,5(10)-trien-17-one (1.5 g.) in methanol (100 ml.). Add sodium borohydride (1.5 g.), with stirring in small aliquots over a period of 1 hour. Stir the mixture for three hours. Add water (100 ml.) slowly with stirring. Extract the mixture with ether. Remove the solvent from the dry extract in vacuo. Dissolve the residue in dichloromethane, add charcoal and heat on a steambath. Filter through a bed of Super Cel. Evaporate the filtrate to a residue in vacuo. Recrystallize the residue from methanol to get the title product (500 mg.), m.p. 112°–116° C.; $\lambda^{KBr}$ 3.08 $\mu$.

ANALYSIS Calcd. for $C_{24}H_{34}O_2 \cdot \frac{1}{4}$ $CH_3OH$: C, 80.33; H, 9.73.

Found: C, 80.43; H, 9.33.

What is claimed:

1. A compound selected from those having the formula:

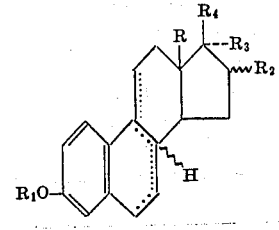

wherein R is (lower)alkyl; $R_1$ is selected from the group consisting of cyclobutylmethylene and cyclopropylmethylene; $R_2$ is selected from the group consisting of hydroxy and hydrogen; $R_3$ is selected from the group consisting of hydrogen, (lower)alkyl, (lower)alkenyl, (lower)alkynyl and halo(lower) alkynyl and $R_4$ is hydroxy; $R_3$ and $R_4$ together are oxo or are concatenated to form ethylenedioxy; the dotted lines represent optional unsaturation; and the symbol ($\xi$) indicates α- or β-configuration.

2. A compound as described in claim 1, which is: d-3-(cyclobutylmethyloxy)estra-1,3,5(10)-trien-17-one.

3. A compound as described in claim 1, which is: d-3-(cyclobutylmethyloxy)-19-nor-17α-pregna-1,3,5(10)-trien-20-yn-17-ol.

4. A compound as described in claim 1, which is: dl-13-ethyl-3-(cyclobutylmethoxy)gona-1,3,5(10)-trien-17-one.

5. A compound as described in claim 1, which is: dl-13-ethyl-3-(cyclobutylmethoxy)-18,19-dinor-17α-pregna-1,3,5(10)-trien-20-yn-17-ol.

6. A compound as described in claim 1, which is: d-3-(cyclopropylmethoxy)estra-1,3,5(10)-trien-17-one.

7. A compound as described in claim 1, which is:

d-3-(cyclopropylmethoxy)-19-nor-17α-pregna-1,3,5(10)-trien-20-yn-17-ol.

8. A compound as described in claim 1, which is: dl-13-ethyl-3-(cyclobutylmethoxy)gona-1,3,5(10)-trien-17β-ol.

9. A compound as described in claim 1, which is: d-3-(cyclobutylmethoxy)estra-1,3,5(10)-trien-17β-ol.

10. A process for the preparation of a 3-substituted-13-(lower)alkylgona-(and 8-isogona)-1,3,5(10)-trien-17-one of the formula:

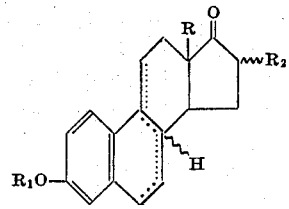

and the $\Delta^6$-, $\Delta^7$-, $\Delta^{8(9)}$-, $\Delta^{9(11)}$- and the $\Delta^{6,8(9)}$- dehydro analogs thereof, wherein R is (lower)alkyl; $R_1$ is selected from the group consisting of cyclobutyl, cyclobutylmethylene and cyclopropylmethylene; $R_2$ is selected from the group consisting of hydroxy and hydrogen; the dotted lines represent optional unsaturation; and the symbol ($\xi$) indicates α- or β- configuration, which comprises forming a 3-ether derivative of a corresponding 3-hydroxyl steroid compound of the formula:

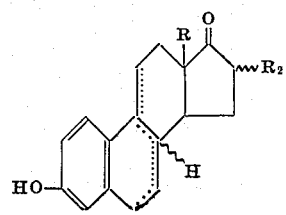

wherein R and $R_2$ are as hereinabove defined by the steps of:

a. reacting said 3-hydroxyl steroid with at least about one equivalent of an alkali metal or alkaline earth metal (lower)-alkoxide in a (lower)alkanol medium until conversion of the 3-hydroxyl group to the corresponding anionic form is substantially complete;

b. displacing said (lower)alkanol medium with an inert organic solvent medium;

c. reacting the mixture of Step (b) with at least about one equivalent of a compound of the formula X–Y, wherein X is selected from the group consisting of cyclobutyl, cyclobutylmethyl and cyclopropylmethyl and Y is a halide or tosylate group; and d. recovering the product of Step (c).

11. A process as defined in claim 10 wherein, in Step (a), said alkali metal (lower)alkoxide is sodium methoxide and said (lower)alkanol medium is methanol.

12. A process as defined in claim 10 wherein, in Step (b), said inert organic solvent medium is dimethylsulfoxide.

13. A process as defined in claim 10 wherein Step (c) is carried out at a temperature of from about 20°C. to about 100° C. for a period of from about 2 hours to about 48 hours.

14. A process as defined in claim 10 wherein, in Step (c), said halide is bromide.

15. A process as defined in claim 10 wherein d-3-(cyclobutyloxy)estra-1,3,5(10)-trien-17-one is prepared by the steps of:

a. reacting d-estrone with sodium methoxide in methanol;

b. removing the methanol by vacuum distillation and adding dimethylsulfoxide;

c. reacting the mixture of Step (b) with cyclobutylbromide; and d. recovering the product by removing the solvent by distillation in a vacuum.

16. A process as defined in claim 10 wherein d-3-(cyclobutylmethyleneoxy)estra-1,3,5(10)-trien-17-one is prepared by the steps of:

a. reacting d-estrone with sodium methoxide in methanol;

b. removing the methanol by vacuum distillation and adding dimethylsulfoxide;

c. reacting the mixture of Step (b) with cyclobutylmethyl tosylate; and d. recovering the product by extracting the mixture of Step (c) with ether and water and distillation in a vacuum.

17. A process as defined in claim 10 wherein dl-13-ethyl-3-(cyclobutylmethyloxy)gona-1,3,5(10)-trien-17-one is prepared by the steps of:

a. reacting dl-13-ethyl-3-(hydroxy)-gona-1,3,5(10)-trien-17-one with sodium methoxide in methanol;

b. removing the methanol by vacuum distillation and adding dimethylsulfoxide;

c. reacting the mixture of Step (b) with cyclobutylmethyl tosylate; and d. recovering the product by adding water to the mixture of Step (c), extracting with ether and distilling the extract in a vacuum.

18. A process as defined in claim 10 wherein d-3-(cyclopropylmethoxy)estra-1,3,5(10)-trien-17-one is prepared by the steps of:

a. reacting d-estrone with sodium methoxide in methanol;

b. removing the methanol by vacuum distillation and adding dimethyl-sulfoxide;

c. reacting the mixture of Step (b) with cyclopropylmethyl tosylate; and d. recovering the product by adding water to the mixture of Step (c), extracting with ether and distilling the extract in a vacuum.

* * * * *